US006678842B1

(12) United States Patent
Shaffer et al.

(10) Patent No.: US 6,678,842 B1
(45) Date of Patent: Jan. 13, 2004

(54) COMMUNICATIONS SYSTEM AND ASSOCIATED DESKEWING METHODS

(75) Inventors: Michael S. Shaffer, Lynnfield, MA (US); Himanshu Mahendra Thaker, Summit, NJ (US); Charles Albert Webb, III, Rumson, NJ (US); Lesley Jen-Yuan Wu, Parsippany, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/459,848

(22) Filed: Dec. 13, 1999

Related U.S. Application Data

(60) Provisional application No. 60/112,379, filed on Dec. 14, 1998.

(51) Int. Cl.[7] .................................................. G11B 5/00
(52) U.S. Cl. ........................................ 714/700; 714/707
(58) Field of Search ............................. 360/26; 375/362, 375/206; 370/335; 714/736, 758, 700, 707; 395/152; 341/51; 358/426

(56) References Cited

U.S. PATENT DOCUMENTS

| | | | | |
|---|---|---|---|---|
| 3,790,954 A | * | 2/1974 | Devore et al. | 714/700 |
| 4,115,759 A | | 9/1978 | Besenfelder | 340/146.1 F |
| 4,122,440 A | * | 10/1978 | Langdon, Jr. et al. | 341/51 |
| 4,472,811 A | * | 9/1984 | Froggatt | 375/362 |
| 4,477,845 A | * | 10/1984 | Mortlock et al. | 360/26 |
| 4,677,618 A | | 6/1987 | Haas et al. | 371/1 |
| 4,731,676 A | * | 3/1988 | Berlekamp | 360/26 |
| 5,155,487 A | | 10/1992 | Yanagi et al. | 341/100 |
| 5,157,530 A | | 10/1992 | Loeb et al. | 359/124 |
| 5,345,451 A | | 9/1994 | Uriu et al. | 371/42 |
| 5,408,473 A | | 4/1995 | Hutchison et al. | 370/100.1 |
| 5,511,067 A | * | 4/1996 | Miller | 370/335 |
| 5,563,885 A | | 10/1996 | Witchey | 370/94.2 |
| 5,610,945 A | | 3/1997 | Hoke et al. | 375/260 |
| 5,615,020 A | * | 3/1997 | Keith | 358/426 |
| 5,703,882 A | | 12/1997 | Jung et al. | 370/474 |
| 5,764,687 A | * | 6/1998 | Easton | 375/206 |
| 5,793,770 A | | 8/1998 | St. John et al. | 370/401 |
| 5,815,737 A | | 9/1998 | Buckland | 395/905 |
| 5,844,923 A | | 12/1998 | Condon | 371/47.1 |
| 5,905,769 A | | 5/1999 | Lee et al. | 375/376 |
| 5,978,377 A | | 11/1999 | Kim et al. | 370/397 |
| 6,105,155 A | * | 8/2000 | Cheng et al. | 714/736 |
| 6,128,761 A | * | 10/2000 | Benayoun et al. | 714/758 |
| 6,204,948 B1 | * | 3/2001 | Coffey et al. | 359/152 |

FOREIGN PATENT DOCUMENTS

| | | | |
|---|---|---|---|
| WO | 96/33563 | 10/1996 | H04J/3/16 |

* cited by examiner

Primary Examiner—David Ton
(74) Attorney, Agent, or Firm—William H. Bollman

(57) ABSTRACT

A communications system includes first and second devices connected by parallel communications channels. The first device preferably comprises a string-based framing coder for determining and appending a string-based framing code to each information symbol string of information symbol strings to be transmitted in parallel over respective parallel communications channels. Each string-based framing code is preferably based upon at least some of the information symbols in the respective information symbol string. In addition, the second device preferably includes a deskewer for aligning received parallel information symbol strings based upon the string-based framing codes. In other words, the string-based framing codes and their use to align received information symbol strings permit the information symbol to be transmitted at high rates and over relatively long distances and thereby be subject skew. The information symbols may be binary bits. The string-based coder may comprise a cyclic redundancy checking (CRC) coder for determining and appending CRC codes to respective information bit strings. Thus, the deskewer may comprise a CRC framer for framing the information bit strings based upon the CRC codes.

63 Claims, 10 Drawing Sheets

COMMUNICATIONS SYSTEM AND ASSOCIATED DESKEWING METHODS

RELATED APPLICATION

The present application is based upon provisional patent application Ser. No. 60/112,379 filed on Dec. 14, 1998, and the entire disclosure of which is incorporated herein by reference.

FIELD OF THE INVENTION

The invention relates to communications systems and methods, and, more particularly, to digital communications systems and associated methods over parallel communications channels.

BACKGROUND OF THE INVENTION

Digital communications are widely used for the transmission of voice, data and video information. Such transmission can extend over large geographical distances, between components within a personal computer, or only between adjacent circuit portions on an integrated circuit. Certain such communications applications benefit from or require the conversion of serial data into parallel data for simultaneous transmission over parallel communications channels, or more generically, from M'ary symbols to N'ary symbols. At the receiving end, the parallel data is desirably converted back into the serial data, and with the bits or symbols in the correct order to avoid data errors.

Unfortunately, the demand for greater data transmission volumes and at ever higher speeds, may result in skew at the receiver. In other words, the parallel communications channels may introduce different delays to the parallel symbol strings they carry. Because of skew, the parallel symbol strings at the receiver can then no longer be simply reassembled into the starting data.

The skew problem with parallel communications channels has been addressed in a number of ways. For example, U.S. Pat. No. 4,677,618 to Haas et al. recognized the dispersion introduced by wavelength division multiplexed communications channels over optical fiber. This patent discloses determining the relative delays between the channels based upon detecting two bits in a given byte of data. The relative times of arrival of the remaining bits in a byte are predetermined using the relative delay between the two detected bits and the known frequency-related dispersion characteristics of the transmission medium. Certain bits in each received byte may then be delayed using clock delay lines or registers, thereby accounting for skew.

Along similar lines, U.S. Pat. No. 5,157,530 to Loeb et al. also determines and accounts for skew imparted by dispersion in fiber optic wavelength division multiplexing. Relative delays are used to control adjustable delay devices in each channel.

U.S. Pat. No. 5,408,473 to Hutchinson et al. is directed to, a technique for synchronizing run-length-limited data transmitted over parallel communications channels. Block boundary synchronization is established during connection initialization by using a property of a required HALT code to detect block boundaries received in each channel. Skew compensation is effected by comparing the times of detection of the block boundaries in the two channels, and appropriately controlling a variable delay in at least one of the channels. If there is a subsequent loss of synchronization, detected transmission errors will eventually result in connection reinitialization and reestablishment of synchronization. Unfortunately, the transmission of the fixed HALT code to detect boundaries may result in false boundary detection. Moreover, since synchronization is not continuously maintained, the technique may be impractical for higher data rates.

U.S. Pat. No. 5,793,770 to St. John et al. is directed to a high-performance parallel interface (HIPPI) to a synchronous optical network (SONET) gateway, and wherein electronic logic circuitry formats data and overhead signals into a data frame for transmission over a fiber optic channel. Stripe skew adjustment is based upon SONET framing, and, as such, the circuitry is relatively complicated, comprising as many as 20,000 logic gates, for example.

The difficulty with skew caused by parallel communications channels is also an important issue to be addressed in communications channels between integrated circuit devices. For example, higher transmission speeds increase the sensitivity to skew, as there is a smaller time window to correctly identify a received bit and have it properly align with bits received on the other parallel communications channels. To provide a higher aggregate transmission rate, the number of parallel communications channels can be increased, without increasing the speed of any given communications channel. However, this may result in significant costs for the additional communications channels. Moreover, for communications between integrated circuits, increasing the number of communications channels increases the number of pins needed for connecting the IC. The number of pins and additional packaging complexity may significantly increase the costs of such approaches.

For communications channels between physical layer devices (PLDs) or PHY devices, and logical link devices (LLDs), typical interfaces are asymmetrical and the devices are operated in a push-pull configuration. Because of the asymmetry, relatively expensive memory is required on the PLD since it is polled by the LLD, such as an asynchronous transfer mode (ATM) device. Further developments and improvements in the communications interface between a PLD and LLD are also hampered by the skew difficulty described above as a result of higher bit rates over limited parallel communications channels.

SUMMARY OF THE INVENTION

In view of the foregoing background, it is therefore an object of the present invention to provide a communications system and associated methods for operating over parallel communications channels at relatively high rates and while accounting for skew.

These and other objects, features and advantages in accordance with the present invention are provided by a communications system including first and second devices connected by parallel communications channels, wherein skew over the communications channels is addressed by a straightforward technique. The first device may comprise a string-based framing coder for determining and appending a string-based framing code to each information symbol string of information symbol strings to be transmitted in parallel over respective parallel communications channels. Each string-based framing code is preferably based upon at least some of the information symbols in the respective information symbol string.

In addition, the second device preferably includes a deskewer for aligning received parallel information symbol strings based upon the string-based framing codes. By virtue of the string-based framing codes and their use to deskew received information symbol strings, the information symbols may be transmitted at high rates and/or over relatively long distances.

The information symbols may be binary bits, for example, in some embodiments of the invention. The string-based coder may comprise a cyclic redundancy checking (CRC) coder for determining and appending CRC codes to respective information bit strings. Thus, the deskewer may comprise a CRC framer for framing the information bit strings based upon the CRC codes. Of course, the second device may also include an error detection and correction circuit using the CRC codes. Each CRC code may be one of a CRC-4 to CRC-32 code, for example.

The deskewer may comprise a framer for framing information symbol strings based upon the respective string-based framing codes, and an aligner for aligning framed information symbol strings relative to one another and based upon the string-based framing codes. The aligner may, in turn, comprise at least one first-in-first-out (FIFO) device connected to the framer for buffering framed information bit strings, and a FIFO controller for aligning framed information bit strings during at least one of a writing and a reading phase of the at least one FIFO device and based upon the string-based framing codes. All of the information symbol strings may have a same number of symbols in some embodiments.

A clock signal may be sent over a communications channel from the first to the second device. In addition, the first device may comprise a scrambler for scrambling the information symbol strings, such as to facilitate clock recovery at the second device in another embodiment. Accordingly, the deskewer may also comprise a descrambler for descrambling received information symbol strings. The scrambler may be located upstream from the string-based framing coder to scramble the information symbol strings prior to determining and appending the string-based framing codes. Alternately, the scrambler may be downstream from the string-based framing coder.

The first device may further comprise an M'ary-to-N'ary symbol converter for converting or mapping M symbols into N information symbol strings for transmission on the parallel communications channels. The deskewing circuit provides the reverse N'ary-to-M'ary conversion at the second device and with the skew removed. The parallel communications channels may be provided over at least one wireline transmission medium, at least one wireless transmission medium, or at least one optical transmission medium.

Another aspect of the invention relates to a method for communicating between first and second devices while providing efficient deskewing. More particularly, the method preferably comprises the steps of determining and appending a string-based framing code to each information symbol string of information symbol strings at the first device for being transmitted in parallel over respective parallel communications channels, and with each string-based framing code being based upon at least some of the information symbols in the respective information symbol string. The method also includes the step of eskewing received information symbol strings at the econd device by aligning received information symbol trings based upon the string-based framing codes.

The symbols may be binary bits, for example. he step of determining and appending the string-based odes may comprise determining and appending cyclic redundancy checking (CRC) codes. The step of deskewing may further comprise the step of framing the information bit strings based upon the CRC codes. In addition, the method may also include the step of performing error detection and correction at the second device using the CRC codes. Each CRC code may be one of a CRC-4 to CRC-32 code.

The step of deskewing preferably comprises: determining framing of the information symbol strings based upon the respective string-based framing codes; and aligning information symbol strings received from parallel communications channels relative to one another and based upon the string-based framing codes. The step of aligning, in turn, may comprise the steps of: providing at least one first-in-first-out (FIFO) device buffering framed information bit strings; and aligning information bit strings during at least one of a writing and a reading phase of the at least one FIFO device and based upon the string-based framing codes.

DETAILED DESCRIPTION OF THE PREFERRED EMBODIMENTS

Figure 1:
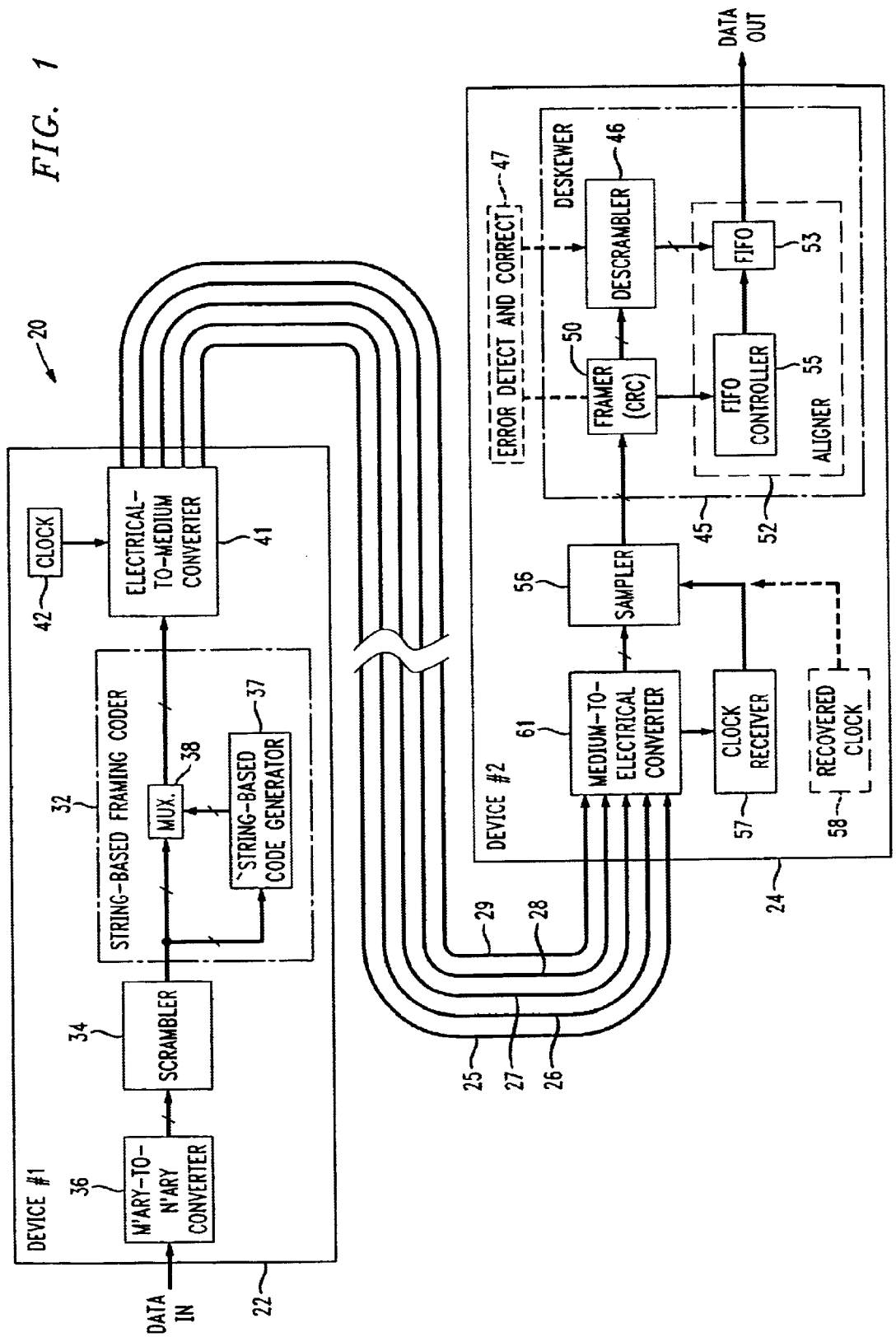
FIG. 1 is a schematic block diagram of a first embodiment of a communications system in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation is used in alternate embodiments to refer to similar elements.

Referring initially to FIGS. 1–5, an embodiment of a communications system 20 in accordance with the present invention is first described. The communications system 20 illustratively includes a first device 22 and a second device 24 connected by parallel communications channels. In the illustrated embodiment, the communications channels are provided by electrical conductors or wires 25–29, although other transmission media may be used to establish or define the parallel communications channels as will be readily appreciated by those skilled in the art. Also in the illustrated embodiment four wires 25–28 are connected to carry information bits, while the fifth wire 29 carries a clock signal from the clock 42. The communications channel for the clock signal is not needed in all embodiments, as the clock signal can typically be recovered if the received information bits have a sufficient number of transitions as will also be appreciated by those skilled in the art.

As explained above in the Background of the Invention, parallel communications channels may present a skew problem especially where the bit rate is relatively high or the distance is relatively long. For example, for an 800 Mbs rate over electrical parallel conductors, skew may limit separation distances to two inches or less.

For clarity of explanation, the following description will be with reference to transmitting binary information elements or information bit strings. In other words, the term "information bit string" will be used, although those of skill in the art will understand that symbols other than binary one's and zero's can also be used in accordance with the present invention. For example, a three-level information symbol may also be used and benefit from the deskewing concepts described herein.

The first device 22 illustratively includes a string-based framing coder 32 for determining and appending a string-based framing code to each information bit string of information bit strings to be transmitted in parallel over respective parallel communications channels. "Appending" is meant to cover both prepending and postpending, although those skilled in the art will recognize that postpending may be preferred, since prepending may require more buffer memory.

A scrambler 34 is connected upstream from the string-based framing coder 32. The scrambler 34 may be desirable to avoid long strings of null values which could hinder clock recovery as will be appreciated by those skilled in the art. In other embodiments, the scrambler 34 may be connected downstream from the string-based framing coder 32. Such an optional scrambler may a self-synchronizing scrambler, such as a X^43 scrambler as will be appreciated by those skilled in the art.

An M'ary-to-N'ary mapper or converter 36 is illustratively connected upstream of the scrambler 34. The M'ary-to-N'ary converter 36 converts the incoming Mbits to N parallel information bit strings for subsequent transmission over the parallel communications channels. The M'ary-to-N'ary converter 36 is conventional and requires no further discussion herein.

Returning again to the string-based framing coder 32, this illustratively includes a string-based code generator 37 for generating each string-based framing code based upon at least some of the information bits in the respective information bit string. A multiplexer 38 appends the string-based codes to the respective information bit strings as will be appreciated by those skilled in the art. An electrical-to-medium converter 41 is connected between the output of the multiplexer 38 and the communications channels provided by the wires 25–29. In this illustrated embodiment, the electrical-to-medium converter 41 may be provided by suitable electrical driver circuitry as will be appreciated by those skilled in the art. In other embodiments, the electrical-to-medium converter 41 may connect to other transmission media.

The second device 24 preferably includes a deskewer 45 for aligning received parallel information bit strings based upon the string-based framing codes. The string-based framing codes and their use to deskew received information bit strings permit the information bits to be transmitted at high rates and/or over relatively long distances.

In one preferred embodiment, the string-based coder 32 comprises a cyclic redundancy checking (CRC) coder for determining and appending CRC codes to respective information bit strings. Thus, the deskewer may comprise a CRC framer for framing the information bit strings based upon the CRC codes. Of course, the second device 24 may also include an error detection and correction circuit 47 using the CRC codes. Each CRC code may be one of a CRC-4 to CRC-32 code, for example. For an information bit string of 1024 bits, for example, a CRC-8 code may be sufficient to ensure quick and accurate framing.

The string-based code may also include other bits in addition to those specifically based on the information bit string, such as the CRC code bits, for example. Some bits may be assigned as counting or identifying bits to be used when the expected delay or skew was greater than a single frame as will be appreciated by those skilled in the art. Of course, other bits could be assigned for other purposes as well.

A particular advantage of the CRC coding is that a straightforward hardware implementation can be achieved with a relatively small number of logic gates as will be appreciated by those skilled in the art. CRC codes are also resistant to false framing while adding relatively little overhead to the information bit strings. Fixed framing in contrast, would likely experience considerable false framing for a similar number of code bits. If the number of fixed framing bits were increased to reduce false framing, the overhead may be considerable. Yet another advantage of CRC codes is that they may also be used for error detection and correction as they are conventionally used. Accordingly, the second device 24 may optionally include the illustrated error detect and correction circuit 47, which needs no further discussion herein.

The deskewer 45 may comprise a framer 50 for framing information bit strings based upon the respective string-based framing codes. The illustrated deskewer 45 of the second device 24 also includes an aligner 52 for aligning framed information bit strings relative to one another and based upon the string-based framing codes. The aligner 52 may, in turn, advantageously comprise at least one first-in-first-out (FIFO) device 53 connected to the framer 50 for buffering framed information bit strings as shown in the illustrated embodiment. The aligner 52 also illustratively includes a FIFO controller 55 for aligning framed information bit strings during at least one of a writing and a reading phase of the at least one FIFO device and based upon the string-based framing codes. The term "FIFO device" is used herein to include a FIFO, a shift register, and any other type of ordered storage element as will be appreciated by those skilled in the art.

All of the information bit strings may have a same number of bits in some embodiments to simplify the system implementation. In other embodiments, the bit strings could have different lengths as would be appreciated by those skilled in the art.

Turning now to the front end of the second device 24, a sampler 56 is connected upstream from the deskewer 45. The sampler 56 samples the received bit string based upon the clocking pulses as will be appreciated by those skilled in the art. Ideally the sampler 56 samples the bit string at a bit midpoint. The clock signal for the sampler 56 may come from the clock receiver 57 or from the recovered clock 58, the operation of both of which will be appreciated by those skilled in the art.

A medium-to-electrical converter 61 is connected between the sampler 56 and the communications channels as provided by the wires 25–29. Of course, other types of converters can be used for different transmission media.

The deskewer 45 also illustratively includes a descrambler 46 for descrambling the information bit strings, such as to facilitate clock recovery at the second device 24. The descrambler 46 is illustratively connected between the framer 50 and the FIFO device 53. In other embodiments, the descrambler 46 may be connected downstream from the FIFO device 53 as will be appreciated by those skilled in the art. Of course, in other embodiments, the descrambler 46 and the scrambler 34 may not be needed at all.

Figure 2:
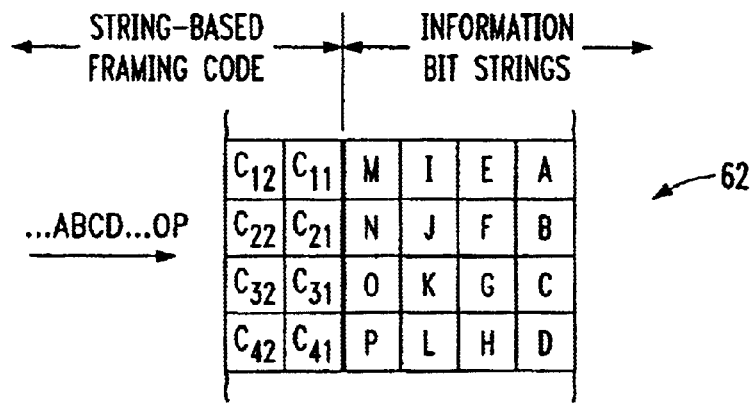
FIG. 2 is a schematic bit position diagram from the output of the first device as shown in FIG. 1.
Figure 3:
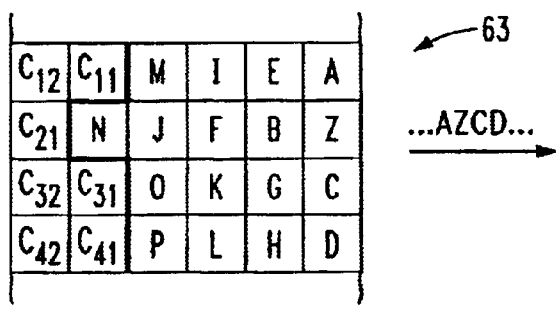
FIG. 3 is a schematic bit position diagram from the input of the second device as shown in FIG. 1 and illustrating skew.
Figure 4:
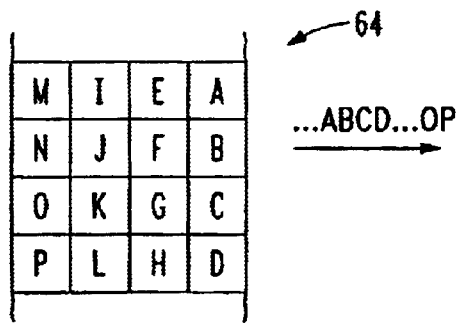
FIG. 4 is a schematic bit position diagram from the FIFO device of the second device as shown in FIG. 1 and illustrating deskewing.

Referring now more particularly to FIGS. 2–4, the deskewing in accordance with the invention is described with reference to a simplified example. The table 62 in FIG. 2 illustrates the alignment of some of the information bits A–P and some of the CRC bits C11–C42. This is the proper alignment that would typically be produced at the output of the first device 22 or at a relatively short distance therefrom as will be appreciated by those skilled in the art.

As shown in the table 63 of FIG. 3, the second information bit string from the top is out of alignment with the other information bit strings. Accordingly, the information bit string that would be recovered without deskewing would be A, Z, C, . . . P. In other words, the information bit string would be incorrect.

Now, as shown in the table 64 of FIG. 4, the deskewing of the present invention re-aligns the frames that may have been misaligned due to skew. Accordingly, the correct information bit string, A, B, . . . P, is produced at the output. The communications system 20 and associated deskewing method using the string-based framing codes advantageously and efficiently removes or accounts for the skew. This permits higher bit rates and/or longer transmission distances. The higher bit rates may permit a reduction of pin count for communication between integrated circuit chips. As the cost for additional pins and packaging complexity may be relatively high, the present invention also permits lower cost communications ICs having an aggregate communication rate that is still relatively high as will be appreciated by those skilled in the art. As will also be appreciated by those skilled in the art, although only one direction of communication has been illustrated, other embodiments of the communications system 10 may include circuitry to implement a reverse direction of communications. In other words, the present invention is also readily applicable to full-duplex communications systems as well. In addition, multiple receiving devices may be connected to one or more transmitting devices as will also be appreciated by those skilled in the art.

Figure 5:
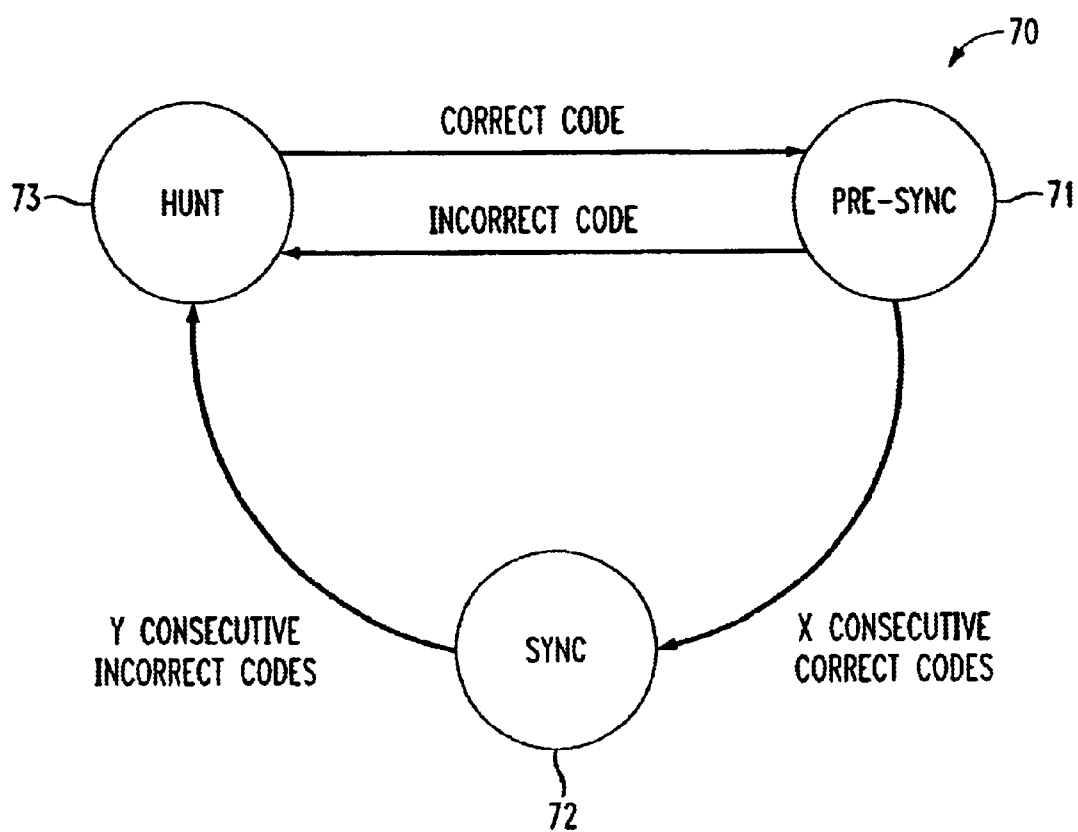
FIG. 5 is a schematic diagram of a framing state machine as may be used in the second device as shown FIG. 1.

Referring now more particularly to FIG. 5, some additional framing or synchronization concepts are now explained. In particular, the illustrated state framing machine 70 has three states: a pre-sync state 71, a hunt state 73 and a sync state 72. Transition between the hunt and pre-sync states is determined based upon a correct or incorrect string-based framing code. The machine 70 changes from the pre-sync state 71 to the sync state 72 if X consecutive correct codes are determined. The machine 70 transitions from the sync state 72 to the hunt state 73 if there are Y consecutive incorrect codes determined. The state framing machine 70 is very similar to state framing machines used in other known data synchronizing applications as will be appreciated by those skilled in the art.

The fundamental string-based framing coding and associated deskewing concepts of the present invention have initially been explained with reference to parallel communications channels provided over wires 25–59. In other words, the communication system 20 operates over a wireline transmission medium. Another wireline application would include operation over a data bus, such as a PCI bus, for example. A typical PCI bus is limited to a relatively low frequency of about 60–70 MHz. Accordingly, for greater information throughput wider buses are needed. The present invention overcomes this difficulty and can allow a PCI bus to operate at a faster clock speed without additional bus width. Other wireline transmission media include twisted copper pairs, and coaxial cables, for example, as will be appreciated by those skilled in the art.

Figure 6:
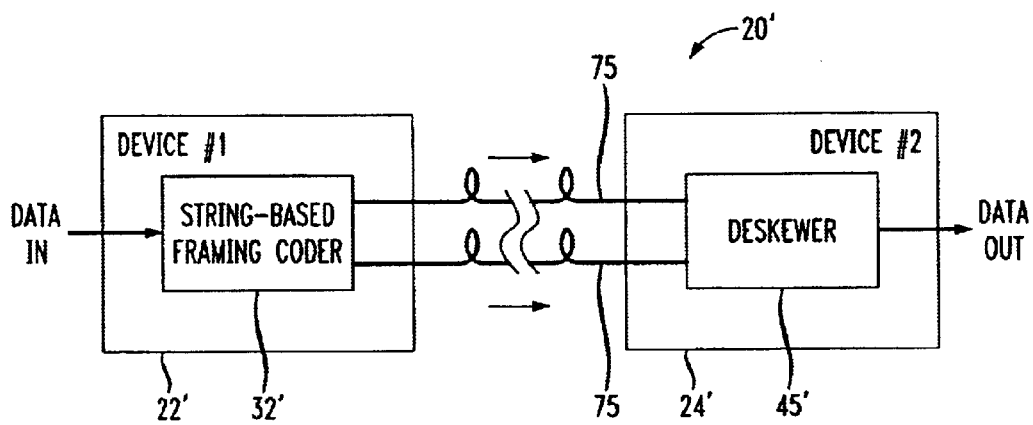
FIG. 6 is a schematic block diagram of an optical fiber embodiment of a communications system in accordance with the present invention.
Figure 7:
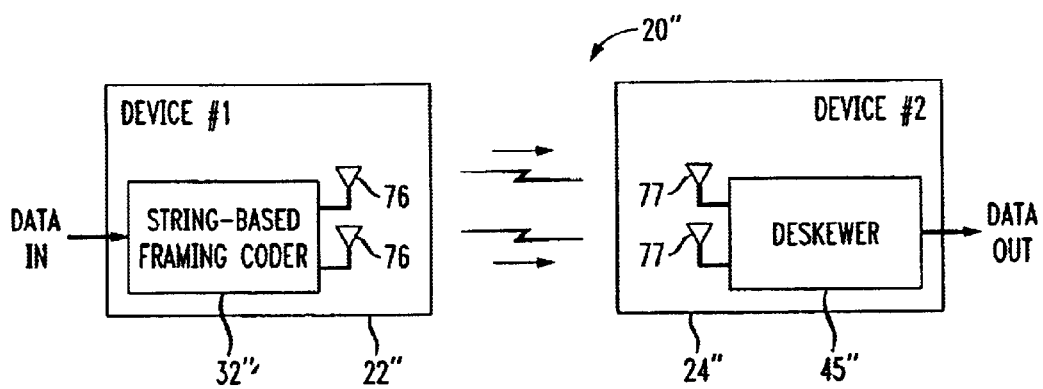
FIG. 7 is a schematic block diagram of a radio embodiment of a communications system in accordance with the present invention.
Figure 8:
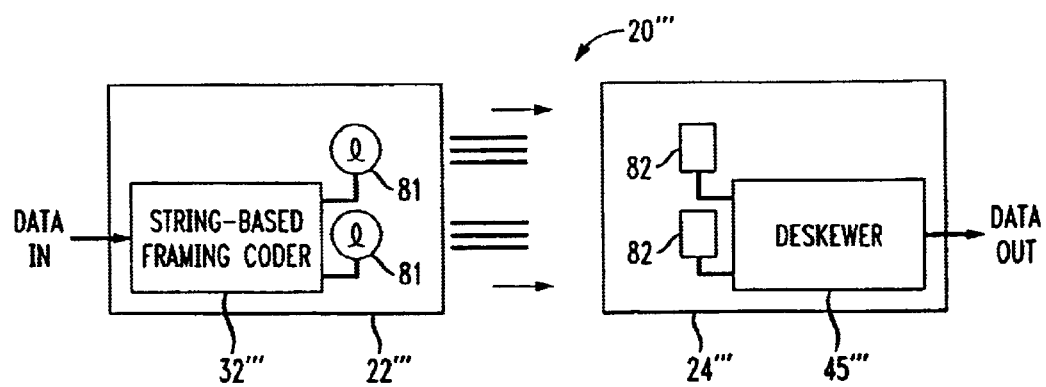
FIG. 8 is a schematic block diagram of an infrared free space embodiment of a communications system in accordance with the present invention.

Turning now additionally to FIGS. 6–8, several alternate embodiments with respect to the transmission media are now described. For the communications system 20' shown in FIG. 6, the communications medium is illustratively provided by two optical fibers 75. The first device 22' includes the string-based framing coder 32', and the second device 24' includes the deskewer 45'. The communications system 20' may also include other components as shown in FIG. 1 and described above.

A first wireless communications system embodiment 20" is explained with particular reference to FIG. 7. In this embodiment, radio transmitters and receivers 76, 77, respectively, and free space provide the communications channels over a wireless medium. The other components are indicated with double prime notation and are similar to those described above.

FIG. 8 illustrates a second wireless communications system 20'" wherein infrared transmitters and infrared detectors 81, 82, respectively, provide the parallel communications channels over free space as will be appreciated by those skilled in the art. Those of skill in the art will also appreciate other more specific implementations and applications of the general communications systems 20, 20', 20" and 20'" described herein.

Figure 9:
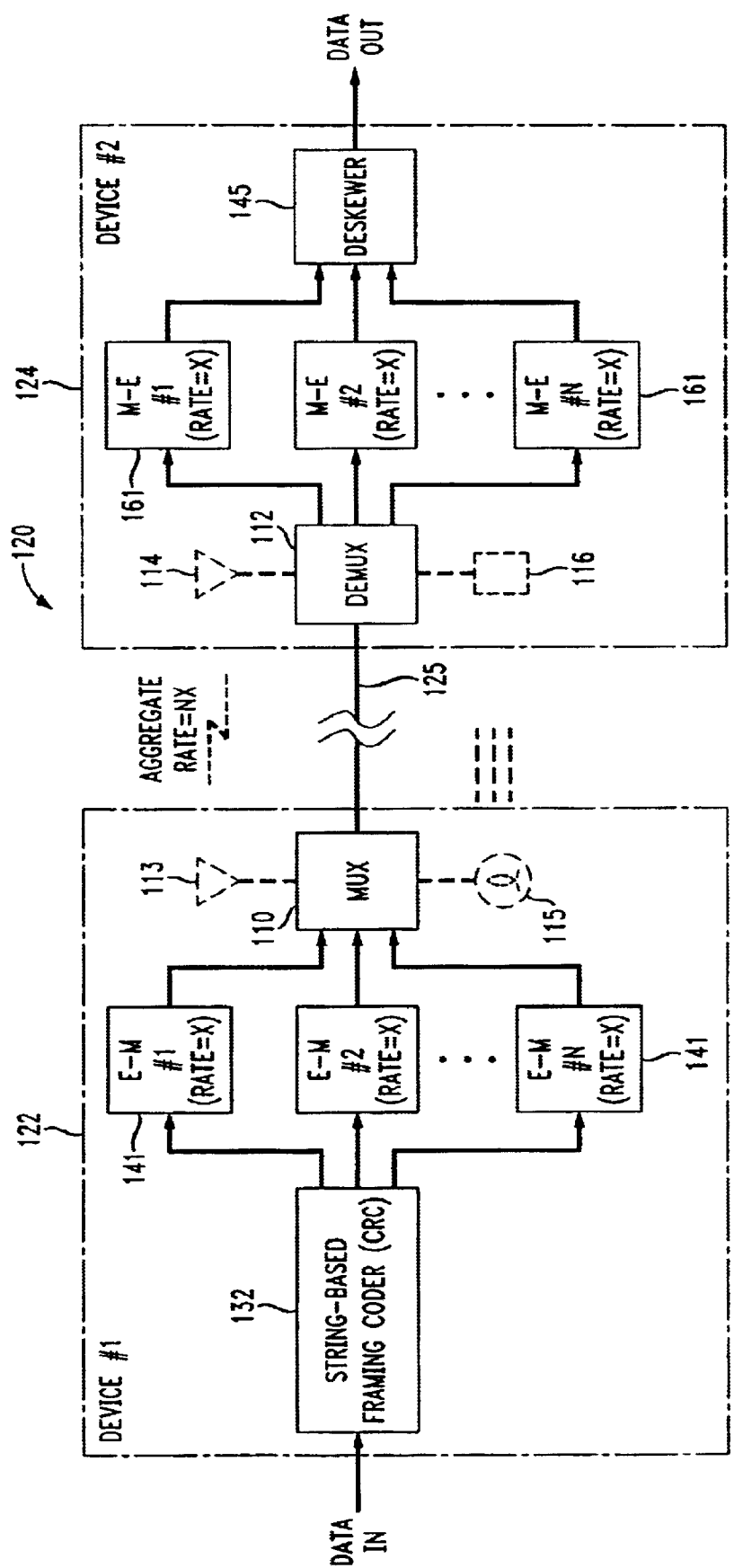
FIG. 9 is a schematic block diagram of another embodiment of a communications system illustrating a bank of lower rate converter electronics and incorporating the deskewing features in accordance with the present invention.
Figure 10:
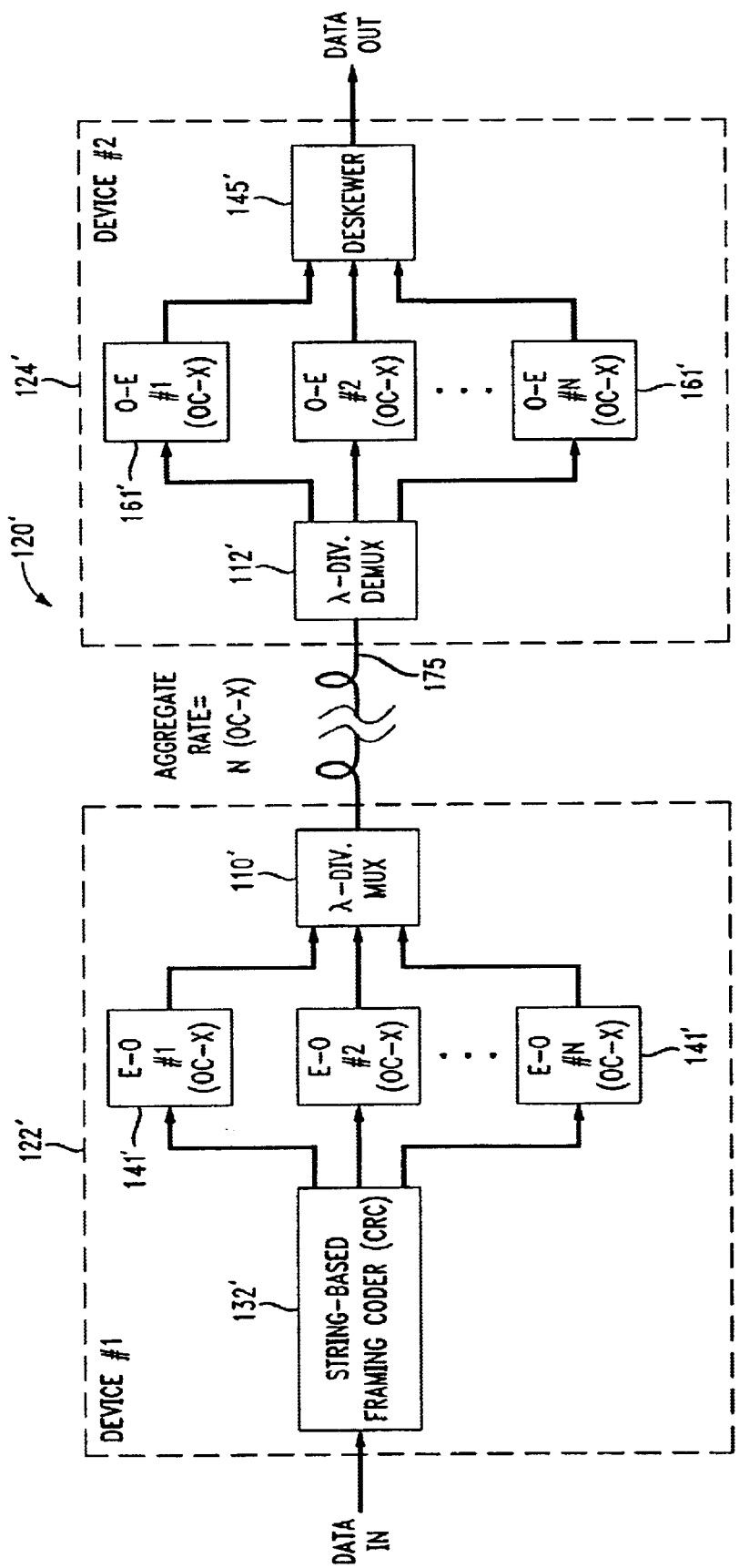
FIG. 10 is a schematic block diagram of an optical fiber embodiment of a communications system as shown in FIG. 9.

Other advantageous features and implementations of the present invention are now described with additional reference to FIGS. 9 and 10. More particularly, as shown in FIG. 9, the invention is also directed to a communications system 120 including a first device 122 comprising a plurality of electrical-to-transmission medium converters 141, and a second device 124 comprising a plurality of transmission medium-to-electrical converters 161. The electrical-totransmission medium converters 141 are connected to respective ones of the transmission medium-to-electrical converters 161 via at least one transmission medium and defining parallel communications channels between the first and second devices. In the illustrated embodiment, the transmission medium is provided by the wireline 125.

In other embodiments, wireless and optical transmission media may be used. A radio wireless medium is schematically indicated by antennas 113, 114, and an infrared or free space optical medium is indicated by source 115 and detector 116.

The first device 122 comprises a string-based framing coder 132 for determining and appending a string-based framing code to each information bit string of information bit strings to be transmitted in parallel over respective parallel communications channels, each string-based framing code being based upon at least some of the information bits in the respective information bit string as described above with respect to the string-based framing coder 32 as described above with reference to FIG. 1. The string-based coder 132 may include a string-based code generator and multiplexer as also described above with respect to FIG. 1.

The second device 124 comprises a deskewer 145 for aligning received information bit strings based upon the string-based framing codes. The deskewer 145 may include the components and/or equivalents as described above for the deskewer 45 shown in the communications system 20 of FIG. 1. Accordingly, lower rate converters 141, 161 can be used in the communication system 120 at significant costs savings and while providing a desired relatively high overall information throughput rate. The deskewing features account for any skewing that may occur through the parallel communications channels.

For longer distances, the first device 122 may further comprise a multiplexer 110 for multiplexing signals from the plurality of electrical-to-transmission medium converters 141 along a common transmission medium, such as the wireline medium 125. In these embodiments, the second device 124 also includes a demultiplexer 112 connected to its transmission medium-to-electrical converters 161 as will be appreciated by those skilled in the art. The medium multiplexing and demultiplexing may reduce the cost for the overall communications system 120 for relatively large distances between the first and second devices 122, 124 as will also be appreciated by those skilled in the art.

For other embodiments, the multiplexer 110 and demultiplexer 112 may not be needed. Those of skill in the art will readily be able to determine the cost tradeoffs to implement the communications system 120 either with or without the mux/demux.

One particularly advantageous use of the tradeoff in converter speed versus number of parallel communication channels is for optical implementations, such as for those in accordance with the synchronous optical network (SONET) and/or synchronous digital hierarchy (SDH) standards. In particular, wavelength division multiplexing (WDM) and dense wavelength division multiplexing (DWDM) are highly developed and permit a relatively large number of communications channels to be established at different optical wavelengths as will be appreciated by those skilled in the art. In the illustrated communications system 120', a larger number of lower rate OC-X converters 141', 161' may be used in place of a lesser number of higher rate converters. The aggregate rate across the fiber 175 can be relatively high, that is, N times the OC-X rate. For example, an OC-192 converter may be 100 times the cost of a OC-48 converter. Accordingly, the communications system 120' may be less expensive than comparable aggregate transmission rate systems using higher speed optical converters.

The different wavelengths multiplexed onto the fiber 175 travel at different speeds through the fiber. In the past, these different speeds have been measured and a fixed offsets added to account for skew. Unfortunately, such approaches may not account of changes in skew as may be caused by fiber aging and/or temperature cycling, for example. Those of skill in the art will appreciate the advantages in terms of efficiency and simplicity provided by the string-based framing coder 132' and deskewer 145' and associated methods in accordance with the invention for the optical communications system 120'.

Figure 11:
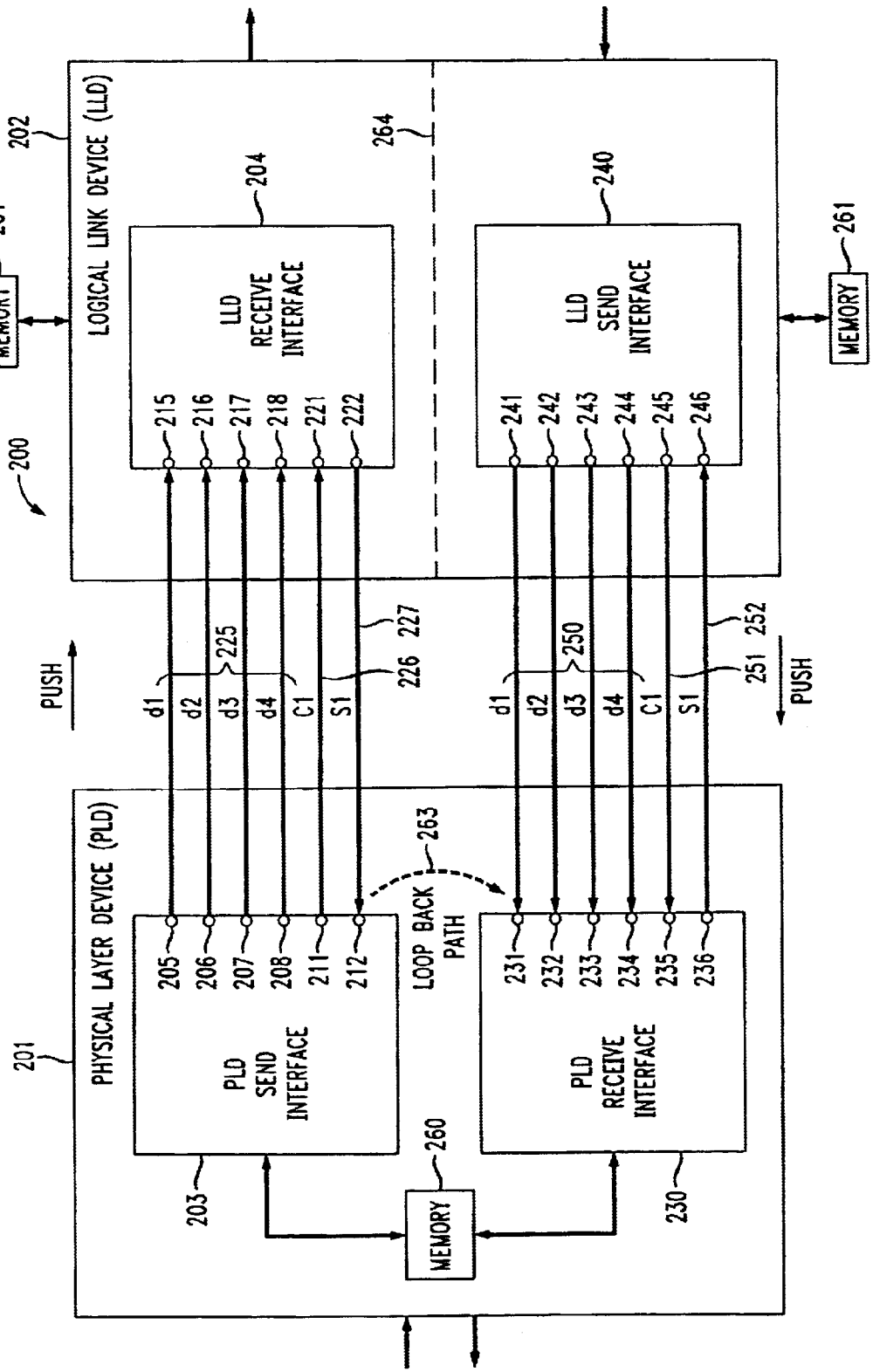
FIG. 11 is a schematic block diagram of a communications system including a PLD and an LLD connected by parallel communications channels in accordance with the present invention.
Figure 12:
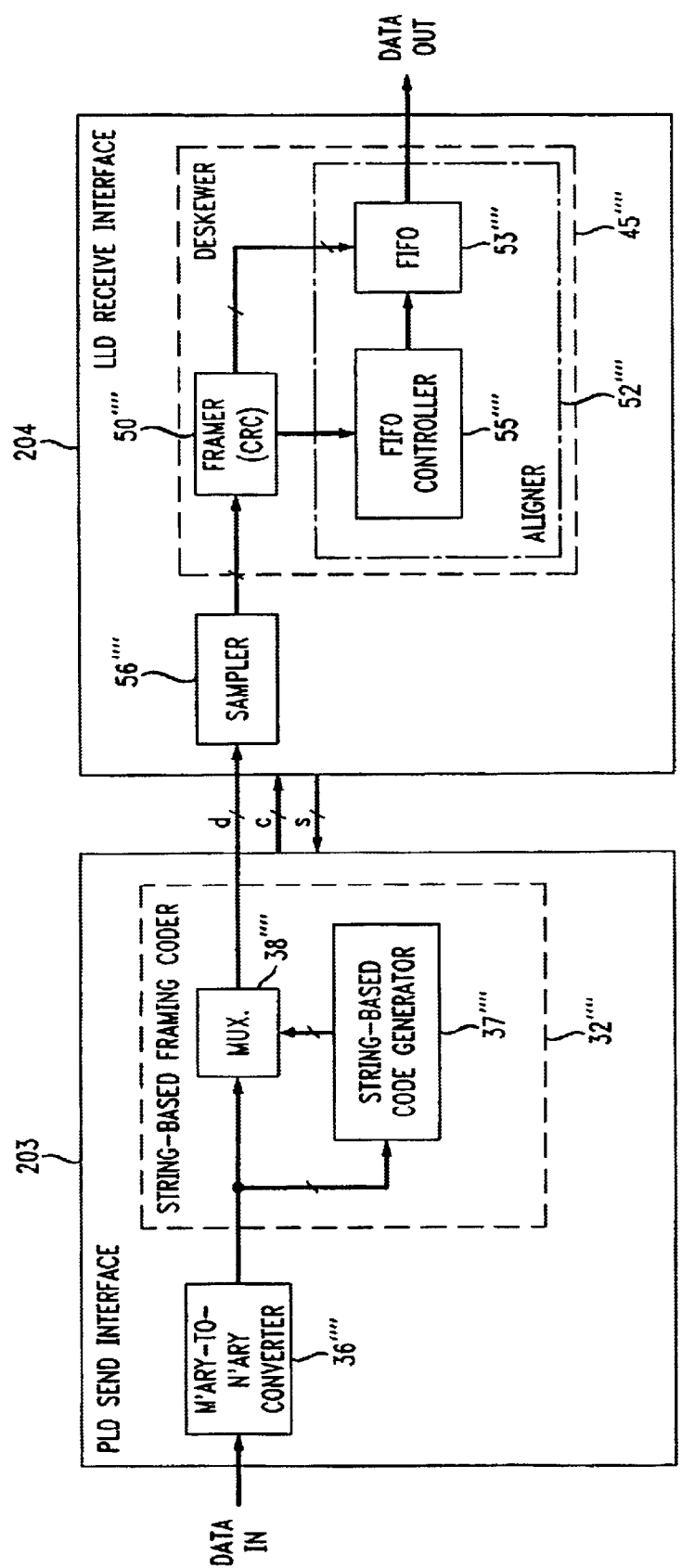
FIG. 12 is a more detailed schematic block diagram of the PLD send interface and LLD receive interface as shown in FIG. 11.

Another communications system 200 in accordance with the invention is now described with particular reference to FIGS. 11 and 12. The illustrated communications system 200 includes a physical layer device (PLD) 201 and a logical link device (LLD) 202 connected thereto. The PLD 201 includes a PLD send interface 203 which, in turn, includes PLD parallel information outputs 205–208 and at least one PLD control output 211.

The LLD 202 comprises an LLD receive interface 204 which, in turn, includes LLD parallel information inputs 215–218 and at least one LLD control input 221. The communications system 200 also includes first parallel communications channels 225 connecting the PLD information outputs 205–208 to respective LLD information inputs 215–218. A second communications channel 226 connects the illustrated single PLD control output 211 to the LLD control input 221 so that control signals are sent from the PLD to the LLD out-of-band from information signals. Accordingly, control speed is enhanced, and information throughput efficiency is not compromised. The number of first and second communications channels 225 and 226 can be different in different embodiments, as will be appreciated by those skilled in the art.

The LLD receive interface 204 further illustratively includes an LLD status output 222, and the PLD send interface 203 includes a PLD status input 212. A third communications channel 227 thus connects the LLD status output 222 to the PLD status input 212.

The PLD 201 also includes a PLD receive interface 230 including PLD parallel information inputs 231–234 and a PLD control input 235. The LLD 202 further comprises an LLD send interface 240 including LLD parallel information outputs 241–244 and an LLD control output 245. In the illustrated embodiment, fourth parallel communications channels 250 connect the LLD information outputs 241–244 to respective PLD information inputs 231–234. In addition, a fifth communications channel 251 connects the LLD control output 245 with the PLD control input 235.

The PLD receive interface 230 may further include a PLD status output 236, the LLD send interface 240 may further include an LLD status input 246, and the communications system 200 may also include a sixth communications channel 252 connecting the PLD status output 236 to the LLD status input 246. In accordance with this aspect of the invention, the PLD 201 and LLD 202 are operable in a push-push configuration.

The push-push configuration overcomes a number of difficulties of conventional push-pull configurations. The PLD 201 typically includes on-chip memory 260 which is relatively expensive. Although the LLD 202 typically requires more memory, the memory 261 is less expensive since it is typically provided off-chip as will be appreciated by those skilled in the art. The push-push configuration relaxes the need for relatively expensive on-chip memory 260 for the PLD 201, since the LLD 202 does not throttle the PLD 201.

Another advantageous feature of the invention is that the interfaces 203, 204, 230 and 240 may be made symmetric. In other words, the PLD send interface 203 and the LLD send interface 240 may be substantially identical, and the PLD receive interface 230 and the LLD receive interface 204 may be substantially identical to thereby define symmetrical interfaces. Symmetrical interfaces may simplify design and manufacturing and offer other advantages including loop-back capabilities as indicated by the dotted loop-back path 263 as illustrated between the PLD send interface 203 and the PLD receiver interface 230 as will be appreciated by those skilled in the art.

The symmetry also permits the LLD 202 to be provided in two separate integrated circuit packages functionally divided as indicated by the dashed horizontal line 264. Since the number of pins can be relatively large and account for a significant portion of the cost, the symmetry and ability to provide two separate ICs is a significant advantage of the present invention.

The LLD 202 may comprise an asynchronous transfer mode (ATM) device, for example, as will be appreciated by those skilled in the art. In addition, the PLD may be a synchronous optical network (SONET) device or a synchronous digital hierarchy (SDH) device as will also be appreciated by those skilled in the art. The LLD 202 may also be an SDL or HDLC device as will also be appreciated by those skilled in the art.

Yet another aspect of the communications system 200 is that the pin count of the PLD 201 and LLD 202 may be kept manageable by using higher speed parallel communications channels while accounting for skew. In particular, as shown with particular reference to FIG. 11, the PLD send interface 203 may comprise a string-based framing coder 32"" for determining and appending a string-based framing code to each information bit string of information bit strings to be transmitted in parallel over respective first parallel communications channels, with each string-based framing code being based upon at least some of the information bits in the respective information bit string. Also, the LLD receive interface 204 may also comprise a deskewer 45"" for aligning received parallel information bit strings based upon the string-based framing codes.

The string-based framing codes may be CRC codes, for example. The illustrated string-based coder 32"" includes a string-based code generator 37"" and multiplexer 38"" as described above. The scrambler may be added, but is not shown in the illustrated embodiment. An M'ary-to-N'ary converter 36"" is upstream from the string-based framing coder 32"".

The deskewer 45"" illustratively includes a framer 50"" for framing information bit strings based upon the respective string-based framing codes, and an aligner 52"" for aligning framed information bit strings relative to one another and based upon the string-based framing codes. The aligner 52"" includes least one first-in-first-out (FIFO) device 53"" connected to the framer for buffering framed information bit strings; and a FIFO controller 55"" for aligning framed information bit strings during at least one of a writing and a reading phase of the at least one FIFO device and based upon the string-based framing codes. A particular example of an efficient framing algorithm is provided in the next portion of this description.

The coding and deskewing may be provided in the reverse direction on information and control signals from the PLD to the LLD. In some embodiments, the parallel communications channels may be provided over electrical conductors as shown in the illustrated embodiment. Of course, other transmission media may also be used.

I. Example Interface

Having already described the general components, concepts, features and advantages of the present invention, this description now includes a specific example of an interface entitled the PNG interface. Of course, this example is meant to further describe the invention by way of example and should not be construed to be limiting of the invention.

PNG is an interface that allows the transport of data from one device to another, at very high data rates, with a minimal number of pins. PNG is symmetrical, and push/push, and can be used at OC-48 rates extensible to OC-192 and beyond. In addition, PNG is designed to transport both ATM cells and packets concurrently.

As shown in FIG. 11 it can be see that PNG includes three kinds of signals: data, control, and status. Control is sent in the same direction as data, and status is sent in the opposite direction. There are thus d+c+s bits that comprise an interface per direction. (Note that unlike Utopia or Utopia like interfaces, PNG is symmetric, and is thus push/push instead of push/pull.) Table 1 indicates representative or suggested values for d, c and s, for various bit rates.

TABLE 1

Proposed Bit Widths and Rates

| | OC-12 | OC-48 | OC-192 |
|---|---|---|---|
| d | 4 @ 155 Mb/s | 4 @ 622 MB/s | 8 @ 1244 MB/s |
| c | 1 @ 155 MB/s | 1 @ 622 MB/s | 2 @ 1244 MB/s |
| s | 1 @ 155 MB/s | 1 @ 622 MB/s | 2 @ 1244 MB/s |

At 622 MB/s and above, controlling skew can be difficult. To ensure alignment between bits, and accomplish framing, each bit has its own framing structure: for every n information bits transmitted, there is a CRC appended. The n information bits, along with the CRC may be referred to as an information frame. The suggested size of n is 1024 bits, and the suggested CRC is a CRC-8 of polynomial $x^8+x^2+x+1$. However, this size and CRC can be varied dependent on an analysis to determine maximal probabilistic acquisition times. Other suggested sizes are 512 bits with a CRC-4 or 2048 bits with a CRC-32. The CRC-4 requires the least hardware, but may require considerable acquisition time because of high false framing probabilities. The CRC-32 requires more framing circuitry.

In addition to the appended CRC, the data will also be scrambled using a frame synchronous scrambler of sequence length 127, of polynomial $x^7+x^6+1$. The scrambler shall be reset to 7'b111–1111 on the most significant bit of the byte following the CRC insertion. Note that the scrambling of information is performed to ensure a uniform distribution of 0's and 1's, to allow for CDR.

It is proposed that a framing state machine similar to HEC delineation be adopted as will be appreciated by those skilled in the art. The framing state machine 70 is shown in FIG. 5, and has already been described.

After frame is found, it is the receiver's responsibility to align the information across multiple bits. In the case of OC-48, the receiver would frame on the 4 d bits and the 1 c bit, and after frame is acquired by all five bits, data and control can be correctly extracted. To accelerate acquisition time, false-positive matches on the CRC can be ignored if frame is not found on all five bits with a limited amount of time (plus or minus a few bits, depending on the allowed skew between bits).

Figure 13:
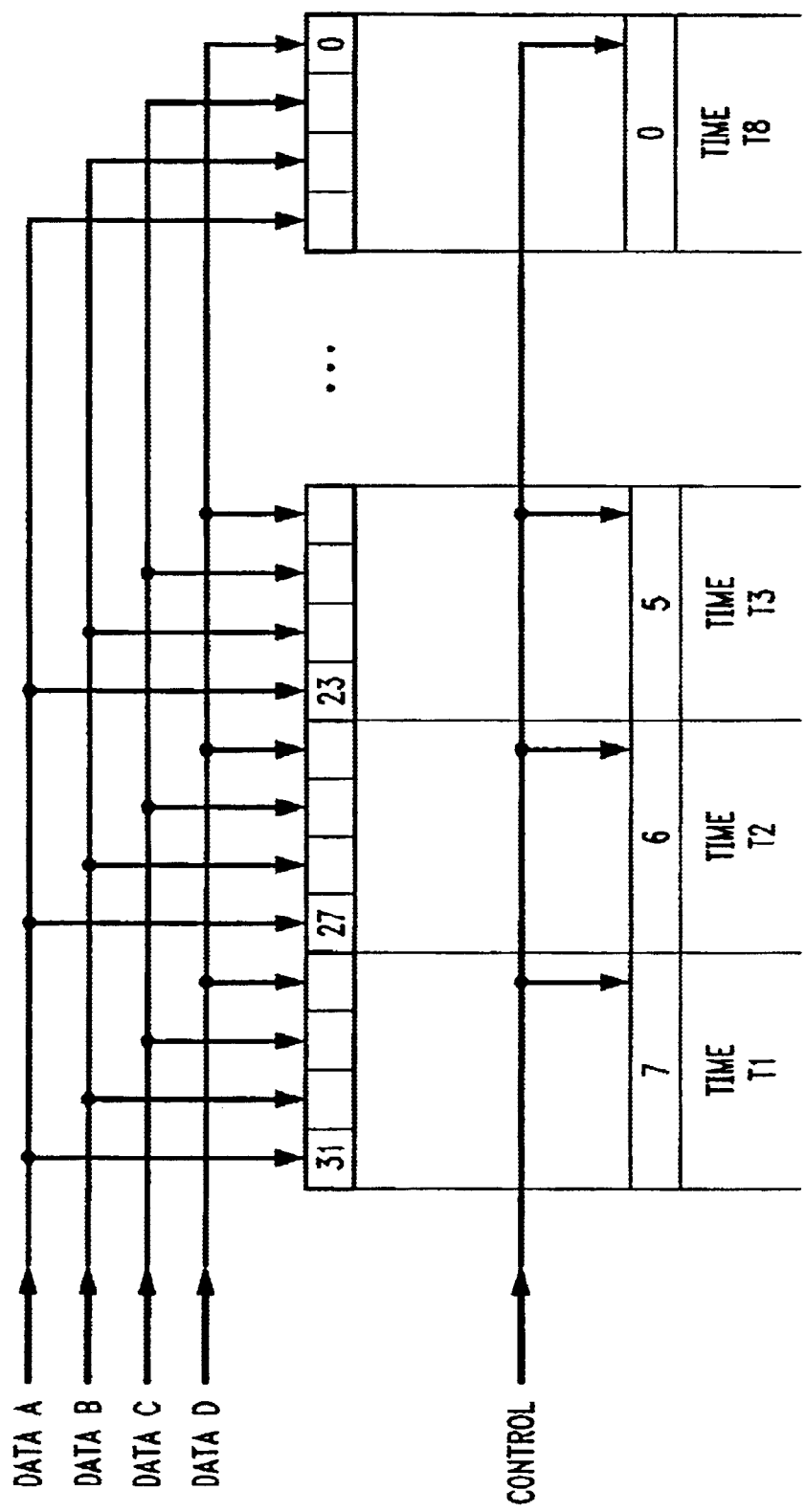
FIG. 13 is a schematic diagram of binning of the data and control bits for the PNG interface example in accordance with the present invention.

In the case of OC-48 with 4 data bits and 1 control bit operation at 622 MB/s, the data and control would be binned as shown in FIG. 13, forming a relationship of 32 bits for every 8 control bits. This binning of course would be performed after information framing has occurred.

After binning of the control and data has occurred, the control information is used to determine status of the associated data. This information includes Port ID (PID), Group ID (GID), Start of Packet (or cell), and End of Packet (or cell), which byte is the end of the packet. The information is given below in Table 2.

TABLE 2

Control and Data Fields

| 8 | | 32 |
|---|---|---|
| CONT | PID | DATA |
| CONT | GID STATUS | DATA |

The first bit of the control field indicates if the control octet (and its associated data field) is a continuation (i.e. part of) the previous control octet. If CONT is 0, then this is the first octet of a new transmission. Port ID (PID) is 7 bits wide, and is used to identify the port that the data is associated with. This results in up to 128 ports. If more ports are required, the Group ID (GID) field which is 3 bits, is used to extend the range of ports to 1024 (2^10). The STATUS field is used to convey the rest of the control information. The encoding of the status field is shown in Table 3.

TABLE 3

Encodings of STATUS

| 0000 | NULL | 0100 | reserved | 1000 | EOP on previous A | 1100 | EOP on A |
| 0001 | SOP | 0101 | reserved | 1001 | EPO on previous B | 1101 | EOP on B |
| 0010 | CONT | 0110 | reserved | 1010 | EPO on previous C | 1110 | EOP on C |
| 0011 | ABORT | 0111 | reserved | 1011 | EPO on previous D | 1111 | EOP on D |

Because the amount of control information that must be sent for each channel cannot be contained in one 8 bit octet, at least two 8 bit octets must be sent before a port context switch can be performed. However, after this, a context switch can be performed on the next 4 byte boundary (implying that the interface is 100% efficient for multiples of 4 byte packets, as long as the packet is 8 bytes or more). Note that any size packet, from one byte upwards, can be sent—less than 8 bytes reduces the efficiency of the link.

Shown in Table 4 below is an example of null data being sent, followed by a 32 byte packet.

TABLE 4

Example of Null Data
Followed by a 32 byte packet

| 0 | PID | | x |
| 1 | GID | 0000 | x |
| | | o | |
| | | o | |
| | | o | |
| 1 | GID | 0000 | x |
| 0 | PID | | DATA |
| 1 | GID | 0001 | DATA |
| 1 | x | 0010 | DATA |
| 1 | x | 0010 | DATA |
| 1 | x | 0010 | DATA |
| 1 | x | 0010 | DATA |
| 1 | x | 1111 | DATA |

Note that with PID and GID, the number of channels that can be supported in PNG is 1024. This could be extended to 2048 if necessary by reducing the status size to 3 bits and extending the GID to 4 bits. However, then the data field would have to be utilized to convey information on packets of sizes 1–4 bytes.

The status field is sent in the opposite direction of the data and control, and is used to provide flow control on a per channel basis. The status field is scrambled, and postpended with a CRC in the same fashion as the control and data. Once the status information has been extracted, it is interpreted according to the format shown below in Table 5.

TABLE 5

Status Information Format

| 7 | 3 | 2 | 4 |
|---|---|---|---|
| PID | GID | R | FSTATUS |

As in the Control field, PID represents the Port ID, and GID represents the Group ID, and these combined bits can be used to provide status on up to 1024 ports. R is reserved, and FSTATUS is used to convey the status of the FIFO associated with the port. The R field could be used to grow either the GID or FSTATUS as necessary.

The encoding of the FSTATUS is shown in Table 6 below.

TABLE 6

Encodings of FSTATUS

| 0000 | Fifo Empty | 0100 | .... | 1000 | ........ | 1100 | ............ |
| 0001 | . | 0101 | ...... | 1001 | ......... | 1101 | ............ |
| 0010 | . | 0110 | ...... | 1010 | ......... | 1110 | ............ |
| 0011 | ... | 0111 | ........ | 1011 | ........... | 1111 | Fifo Full |

If only one bit status is required, the MSB bit of the FSTATUS can be employed. The receiving side (defined as the side receiving data and control but sending status) is responsible for determining the status of its FIFOs, and conveying the information to the sending side (defined as the side sending data and control but receiving status). A one bit fifo status can be thought of as similar to TxClav in Utopia interfaces.

The sending side is required to maintain the status of every FIFO on the receiving side. This status is continuously updated whenever a FIFO status changes at the receiver, and in the absence of any such information to convey, the receiver round robins through all active FIFOs to ensure that the sending side is continuously synchronized. In the case of a traditional PHY device as the sender, it does not require status. As such, status information can be ignored by the PHY as a sender.

A logical block diagram of the PNG interface is shown in FIG. 1 and needs no further description.

II. Deskew Algorithm Example

Having described the general components, concepts, features and advantages of the present invention, and an interface example this description now includes a specific example of a deskew algorithm. This deskew algorithm is meant to further describe the invention by way of example and should not be construed to be limiting of the invention.

As more bandwidth is needed in a network, customers desire the ability to add bandwidth between two points in an on-demand basis. In a SONET/SDH network this bandwidth is normally provided by sending the next larger concatenation level to the point needing the bandwidth. These networks have major limitations on the timeslot the new concatenated signal can occupy. In accordance with the invention, bandwidth can be allocated/de-allocated at the STS-1/VC-4 level for SONET/SDH signals respectively with no restriction on the STS-1/VC-4 signal used. At the receiving end, a mechanism must exist to align these disjoint streams into one stream without external intervention (software) and minimal hardware (gate count). This example addresses the software intervention and gate count problem by implementing a completely hardware based deskewing algorithm.

The SONET/SDH SPE deskewing algorithm allows the dynamic alignment of multiple STS-1/VC-4 signals within a user defined group. Accordingly, signals can be added or dropped dynamically from the user defined group without introducing errors in the output signal.

Figure 14:
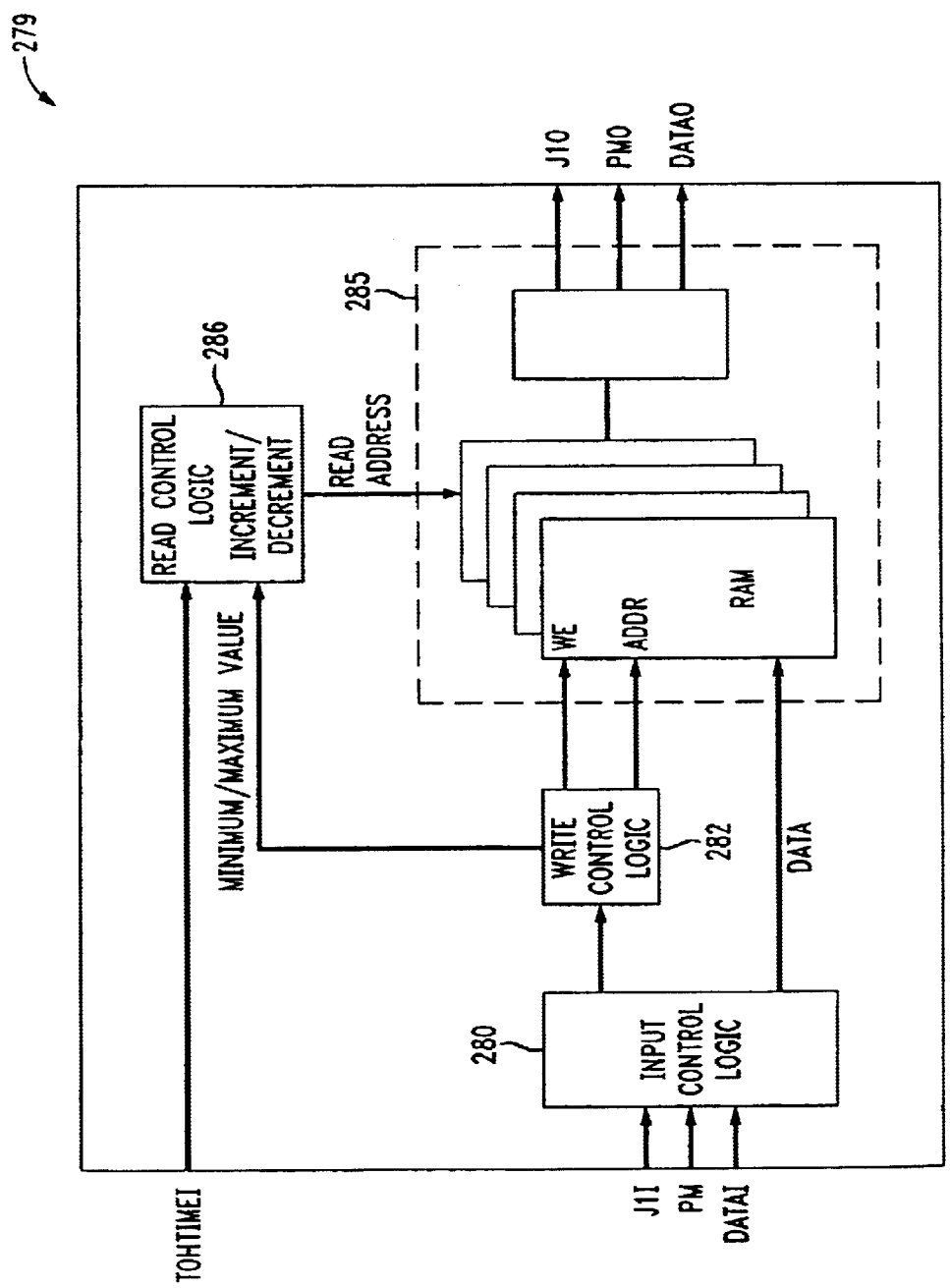
FIG. 14 is a schematic block diagram of an example of a deskewing algorithm in accordance with the present invention.

As understood with reference to FIG. 14, the deskewing algorithm 279 takes into account features of a SONET/SDH frame that allow a simple algorithm to align SPEs of different STS-1/VC-4 signals. The algorithm 279 includes four basic components: an input control logic block 280, a write control logic block 281, data storage element block 285, and read control logic block 286.

The input control logic block 280 contains the provisioned information needed to determine which STS-1/VC-4 signals are grouped together to form a Virtual group. This information is also used by other control blocks for deskewing purposes.

The write control logic block 282 contains the write address generation logic and the minimum write address and maximum write address calculation logic for each virtual group. A virtual group includes from two (2) to forty-eight (48) STS-1 signals or two (2) to sixteen (16) VC-4 signals. The write address is synchronized to the J1l marker. This ensures the J1 POH byte is always written into the same location in the data storage memory. The write address always writes 783 (STS-1) or 783*3 (VC-4) bytes between J1 markers. This is independent of increment or decrement operations that have occurred to the incoming pointer values as the signal passed through pointer processor elements in the network. Simultaneously, during each row the maximum and minimum write addresses are calculated for all virtual groups. This information is used by the read control logic 286 in determining if an increment or decrement operation is needed. This ensures all signals within the VC group stay aligned within the bounds of the FIFO depth.

The data storage element block 285 includes sufficient RAM to buffer one row of data for each incoming STS-1 or VC-4 signal.

The read control logic block 286 ensures the read pointer moves/holds as the phase relationship between the incoming signals change due to pointer increments and decrements. An evaluation is made once per row to determine if an increment operation (read address held during SPE time) or a decrement operation (advance read address during TOH time) is necessary. The read pointer counts during SPE time only, except when a decrement operation is executed. If all incoming signals of the virtual group have the same J1 byte location the read and write pointers will be offset by half the storage depth and the min/max values will be equal after the de-skewing pro-cess.

In summary, the de-skewing algorithm allows any number of signals to make-up a virtual group and keep these signals aligned as long as the incoming signal has a consistent number of bytes between markers and the relative offset between the markers are not greater than the FIFO depth. The description above is specific to SONET/SDH signals but this invention can be used for any type signals that must be aligned.

The main advantage of this approach is the simplicity of the deskewing algorithm which takes into account the standard characteristics of a SONET/SDH frame structure and pointer movement behavior. The incoming signals making up a virtual group are automatically aligned through the write algorithm and the read algorithm ensures the output is error free as the incoming signals change phase with respect to each other. This invention can be used in an alignment FIFO circuit to align Virtual Concatenated signals in a SONET/SDH network or perform high speed deskewing in a packet network.

Indeed, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A communications system comprising:

a first device and a second device;

parallel communications channels connecting said first and second devices;

said first device comprising a string-based framing coder, for determining and appending a string-based framing code to each information symbol string of information symbol strings to be transmitted in parallel over respective parallel communications channels, each string-based framing code being based upon at least some of the information symbols in the respective information symbol string; and said second device comprising a deskewer for aligning received parallel information symbol strings based upon the string-based framing codes.

2. A communications system according to claim 1 wherein each information symbol comprises a binary bit; and wherein said string-based coder comprises a cyclic redundancy checking (CRC) coder for determining and appending CRC codes to respective information bit strings.

3. A communications system according to claim 2 wherein said deskewer comprises a CRC framer for framing the information bit strings based upon the CRC codes.

4. A communications system according to claim 2 wherein said second device further comprises an error detection and correction circuit using the CRC codes.

5. A communications system according to claim 2 wherein each CRC code is one of a CRC-4 to CRC-32 code.

6. A communications system according to claim 1 wherein said deskewer comprises:
 a framer for framing information symbol strings based upon the respective string-based framing codes; and
 an aligner for aligning framed information symbol strings relative to one another and based upon the string-based framing codes.

7. A communications system according to claim 6 wherein each information symbol comprises a binary bit; and wherein said aligner comprises:
 at least one first-in-first-out (FIFO) device connected to said framer for buffering framed information bit strings; and
 a FIFO controller for aligning framed information bit strings during at least one of a writing and a reading phase of said at least one FIFO device and based upon the string-based framing codes.

8. A communications system according to claim 1 wherein all of the information symbol strings have a same number of symbols.

9. A communications system according to claim 1 wherein said first device comprises a scrambler for scrambling the information bit strings; and wherein said deskewer comprises a descrambler for descrambling received information symbol strings.

10. A communications system according to claim 9 wherein said scrambler is located upstream from said string-based framing coder to scramble the information symbol strings prior to determining and appending the string-based framing codes.

11. A communications system according to claim 1 wherein said first device further comprises a clock generating circuit, wherein said plurality of communications channels comprises a clock channel, and wherein said second device comprises a clock receiving circuit connected to the clock channel.

12. A communications system according to claim 1 wherein said second device comprises a clock recovery circuit for recovering a clock signal based upon received symbol strings and string-based codes.

13. A communications system according to claim 1 wherein said first device further comprises an M'ary-to-N'ary converter for converting M information symbols into N information symbols strings for transmission on said parallel communications channels.

14. A communications system according to claim 1 wherein said parallel communications channels are provided over at least one wireline transmission medium.

15. A communications system according to claim 1 wherein said parallel communications channels are provided over at least one wireless transmission medium.

16. A communications system according to claim 1 wherein said parallel communications channels are provided over at least one optical transmission medium.

17. A communications system comprising:
 a first device and a second device to be connected together over parallel communications channels;
 said first device comprising a cyclic redundancy check (CRC) coder for determining and appending a CRC code to each information bit string of information bit strings to be transmitted in parallel over respective parallel communications channels, each CRC code being based upon at least some of the information bits in the respective information bit string;
 said second device comprising a deskewer for aligning received parallel information bit strings based upon the CRC codes.

18. A communications system according to claim 17 wherein said deskewer comprises a CRC framer for framing the information bit strings based upon the CRC codes.

19. A communications system according to claim 17 wherein said second device further comprises an error detection and correction circuit using the CRC codes.

20. A communications system according to claim 17 wherein each CRC code is one of a CRC-4 to CRC-32 code.

21. A communications system according to claim 17 wherein said deskewer comprises:
 a framer for framing information bit strings based upon the respective CRC codes; and
 an aligner for aligning framed information bit strings relative to one another and based upon the CRC codes.

22. A communications system according to claim 21 wherein said aligner comprises:
 at least one first-in-first-out (FIFO) device connected to said framer for buffering framed information bit strings; and
 a FIFO controller for aligning framed information bit strings during at least one of a writing and a reading phase of said at least one FIFO device and based upon the CRC codes.

23. A communications system according to claim 17 wherein all of the information bit strings have a same number of bits.

24. A communications system according to claim 17 wherein said first device comprises a scrambler for scrambling the information bit strings; and wherein said deskewer comprises a descrambler for descrambling received information bit strings.

25. A communications system according to claim 24 wherein said scrambler is located upstream from said CRC coder to scramble the information bit strings prior to determining and appending the CRC codes.

26. A deskewer for information symbol strings received over parallel communications channels, and wherein the information symbol strings have string-based framing codes appended thereto prior to transmission over the parallel communications channels, the deskewer comprising:
 a framer for framing the information bit strings based upon the respective string-based framing codes; and
 an aligner for aligning framed information symbol strings relative to one another and based upon the string-based framing codes received over the parallel communication channels, said string-based framing codes based upon at least some of information bits in a respective information symbol string.

27. A deskewer according to claim 26 wherein the information symbols comprise binary bits; and wherein string-based codes comprise cyclic redundancy checking (CRC) codes; and wherein said framer comprises a CRC framer.

28. A deskewer according to claim 27 wherein each CRC code is one of a CRC-4 to CRC-32 code.

29. A deskewer according to claim 26 wherein the information symbols comprise binary bits; and wherein said aligner comprises:
 at least one first-in-first-out (FIFO) device connected to said framer for buffering framed information bit strings; and
 a FIFO controller for aligning framed information bit strings during at least one of a writing and a reading phase of said at least one FIFO device and based upon the string-based framing codes.

30. A deskewer according to claim 26 wherein all of the information symbol strings have a same number of symbols.

31. A deskewer for information bit strings received over parallel communications channels, and wherein the information bit strings have cyclic redundancy checking (CRC) codes appended thereto prior to transmission over the parallel communications channels, the deskewer comprising:
   a CRC framer for determining framing of the information bit strings based upon the respective CRC codes;
   at least one first-in-first-out (FIFO) device connected to said CRC framer for buffering framed information bit strings; and
   a FIFO controller for aligning information bit strings from the parallel communications channels during at least one of a writing and a reading phase of said at least one FIFO device and based upon the CRC codes, said CRC codes based upon at least some of information bits in a respective information symbol string.

32. A deskewer according to claim 31 wherein each CRC code is one of a CRC-4 to CRC-32 code.

33. A deskewer according to claim 31 wherein all of the information bit strings have a same number of bits.

34. A method for communicating over parallel communications channels from a first device to a second device, the method comprising the steps of:
   determining and appending a string-based framing code to each information symbol string of information symbol strings at the first device and being transmitted in parallel over respective parallel communications channels, each string-based framing code being based upon at least some of the information symbols in the respective information symbol string; and
   deskewing received information symbol strings at the second device by aligning received information symbol strings based upon the string-based framing codes.

35. A method according to claim 34 wherein the each information symbol comprises a binary bit; and wherein the step of determining and appending the string-based codes comprises determining and appending cyclic redundancy checking (CRC) codes.

36. A method according to claim 35 wherein the step of deskewing further comprises the step of framing the information bit strings based upon the CRC codes.

37. A method according to claim 35 further comprising the step of performing error detection and correction circuit at the second device using the CRC codes.

38. A method according to claim 35 wherein each CRC code is one of a CRC-4 to CRC-32 code.

39. A method according to claim 34 wherein the step of deskewing comprises:
   determining framing of the information symbol strings based upon the respective string-based framing codes; and
   aligning information symbol strings received from parallel communications channels relative to one another and based upon the string-based framing codes.

40. A method according to claim 39 wherein each information symbol comprises a binary bit; and wherein the step of aligning comprises the steps of:
   providing at least one first-in-first-out (FIFO) device buffering framed information bit strings; and
   aligning information bit strings during at least one of a writing and a reading phase of the at least one FIFO device and based upon the string-based framing codes.

41. A method according to claim 34 wherein all of the information symbol strings have a same number of symbols.

42. A method according to claim 34 further comprising the steps of scrambling the information symbol strings at the first device; and descrambling received information symbol strings at the second device.

43. A method according to claim 42 wherein the step of scrambling is performed prior to determining and appending the string-based framing codes.

44. A method according to claim 34 further comprising the steps of:
   generating a clock signal at the first device;
   transmitting the clock signal over a communications channel; and
   receiving the clock signal at the second device.

45. A method according to claim 34 further comprising the step of recovering a clock signal at the second device based upon received symbol strings and string-based codes.

46. A method according to claim 34 further comprising the step of performing at the first device an M'ary -to-N'ary conversion of M information symbols into N information symbol strings for transmission on the parallel communications channels.

47. A method according to claim 34 wherein the parallel communications channels are provided over at least one wireline transmission medium.

48. A method according to claim 34 wherein the parallel communications channels are provided over at least one wireless transmission medium.

49. A method according to claim 34 wherein the parallel communications channels are provided over at least one optical transmission medium.

50. A method for communicating over parallel communications channels from a first device to a second device comprising the steps of:
   determining framing of information symbol strings based upon respective cyclic redundancy checking (CRC) codes;
   determining and appending a cyclic redundancy checking (CRC) code to each information bit string of information bit strings at the first device and being transmitted in parallel over respective parallel communications channels, each CRC code being based upon at least some of the information bits in the respective information bit string; and
   deskewing received information bit strings at the second device by framing and aligning received information bit strings based upon the CRC codes.

51. A method according to claim 50 wherein each CRC code is one of a CRC-4 to CRC-32 code.

52. A method according to claim 50 wherein the step of aligning comprises the steps of:
   providing at least one first-in-first-out (FIFO) device buffering framed information bit strings; and
   aligning information bit strings during at least one of a writing and a reading phase of the at least one FIFO device and based upon the CRC codes.

53. A method according to claim 50 wherein all of the information bit strings have a same number of bits.

54. A method according to claim 50 further comprising the steps of scrambling the information bit strings at the first device; and descrambling received information bit strings at the second device.

55. A method according to claim 54 wherein the step of scrambling is performed prior to determining and appending the CRC codes.

56. A method for deskewing information symbol strings received over parallel communications channels, and wherein the information symbol strings have string-based framing codes appended thereto prior to transmission over the parallel communications channels, the method comprising the steps of:

determining framing of the information symbol strings based upon the respective string-based framing codes; and aligning information symbol strings received from parallel communications channels relative to one another and based upon the string-based framing codes, each string-based framing code being based upon at least some of information bits in a respective information symbol string.

57. A method according to claim 56 wherein each information symbol comprises a binary bit; wherein the string-based codes comprise cyclic redundancy checking (CRC) codes; and wherein the step of determining framing comprises determining framing based upon the CRC codes.

58. A method according to claim 57 wherein each CRC code is one of a CRC-4 to CRC-32 code.

59. A method according to claim 56 wherein each symbol comprises a binary bit; and wherein the step of aligning comprises the steps of:

providing at least one first-in-first-out (FIFO) device buffering framed information bit strings; and aligning information bit strings during at least one of a writing and a reading phase of the at least one FIFO device and based upon the string-based framing codes.

60. A deskewer according to claim 56 wherein all of the information symbol strings have a same number of symbols.

61. A method for deskewing information bit strings received over parallel communications channels, and wherein the information bit strings have cyclic redundancy checking (CRC) codes appended thereto prior to transmission over the parallel communications channels, the method comprising the steps of:

determining framing of the information bit strings based upon the respective CRC codes;

providing at least one first-in-first-out (FIFO) device buffering framed information bit strings; and aligning parallel information bit strings during at least one of a writing and a reading phase of the at least one FIFO device and based upon the CRC codes, each CRC code being based upon at least some of the information bits in a respective information bit string.

62. A method according to claim 61 wherein each CRC code is one of a CRC-4 to CRC-32 code.

63. A method according to claim 61 wherein all of the information bit strings have a same number of bits.

* * * * *